United States Patent [19]
Janin

[11] 3,925,401

[45] Dec. 9, 1975

[54] PROCESS FOR THE PREPARATION OF DIBENZOTHIAZOLYL DISULPHIDE

[75] Inventor: Raymond Janin, Irigny, France

[73] Assignee: Rhone-Poulenc, S.A., Paris, France

[22] Filed: Nov. 7, 1973

[21] Appl. No.: 413,574

[30] Foreign Application Priority Data
Nov. 8, 1972  France .............................. 72.39514

[52] U.S. Cl. ...... 260/306.5; 260/302 H; 260/302 S; 260/306
[51] Int. Cl.² ..................................... C07D 277/78
[58] Field of Search ..................... 260/306.5, 302 H

[56] References Cited
OTHER PUBLICATIONS

Elderfield (ed.), Heterocyclic Compounds, Vol. 5, N.Y., John Wiley & Sons, 1957, p. 563.

Reid, Organic Chemistry of Bivalent Sulfur, Vol. 1, N.Y., Chemical Publishing Co., 1958, p. 122.

*Primary Examiner*—R. Gallagher
*Attorney, Agent, or Firm*—Stevens, Davis, Miller & Mosher

[57] ABSTRACT

2,2'-dithiazolyl disulphides, such as 2,2'-dibenzothiazolyl disulphide, are obtained by oxidising the corresponding 2-mercapto-thiazole with molecular oxygen and iron chloride using as solvent a saturated aliphatic alcohol containing 1–10 carbon atoms.

7 Claims, No Drawings

PROCESS FOR THE PREPARATION OF DIBENZOTHIAZOLYL DISULPHIDE

The present invention relates to the preparation of 2,2'-dithiazolyl disulphides, and more particularly 2,2'-dibenzothiazolyl disulphides, from 2-mercapto-thiazoles.

2,2'-dithiazolyl disulphides are very valuable industrial products which are used mainly as adjuvants in the vulcanisation of rubber. Disulphides are usually prepared by oxidation of the corresponding thiols using oxidising agents of diverse nature, the choice of which depends on the oxidation-reduction potential of the thiol/disulphide system. Thus numerous thiols are oxidised simply with oxygen or air at ambient temperature in the absence or presence of catalysts such as heavy metal salts and especially copper or iron salts, whilst in the case of other thiols, and particularly in the case of tertiary thiols, it is necessary to resort to powerful oxidising agents such as alkali metal hypohalogenites (sodium hypochlorite and sodium hypoiodite), halogens, alkali metal or alkaline earth metal persulphates, nitric acid, and nitrous acid in the presence or absence of oxygen. The latter method is that most frequently used for the industrial preparation of thiazolyl disulphides (see U.S. Pat. Specification Nos. 2,119,131; 3,062,825; 1,908,935; and French Patent Specification No. 1,244,475). Although these processes lead to excellent yields of disulphides, they possess disadvantages of a technological nature inherent to the use of nitriles or nitrous acid. It is thus desirable to resort to a process for the oxidation of 2-mercapto-thiazoles which employs cheap oxidising agents and does not present any technical difficulty in use. It is generally important that the process should lead to easy recovery of the disulphide.

The present invention provides a process for the preparation of a 2,2'-dithiazolyl disulphide of the general formula:

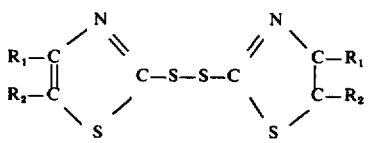

(I)

in which $R_1$ and $R_2$, which may be identical or different, each represents a hydrogen atom, a halogen atom, a nitro group, an alkyl or alkoxy radical containing 1 to 5 carbon atoms, or an unsubstituted aryl, haloaryl, nitroaryl, alkaryl or alkoxyaryl radical, where the aryl residue contains 6 to 12 carbon atoms and the alkyl or alkoxy residues contain 1 to 5 carbon atoms, or $R_1$ and $R_2$ together form a divalent radical of the general formula:

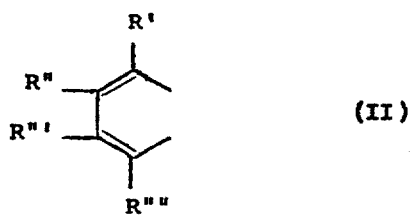

(II)

in which R', R'', R''' and R'''', which may be identical or different, each represents a hydrogen atom, a halogen atom, a nitro group, an alkyl or alkoxy radical containing 1 to 5 carbon atoms, or an unsubstituted aryl, haloaryl, nitroaryl, alkaryl or alkoxyaryl radical where the aryl residue contains 6 to 12 carbon atoms and the alkyl or alkoxy residue contains 1 to 5 carbon atoms, which comprises oxidation of a 2-mercapto-thiazole of the general formula:

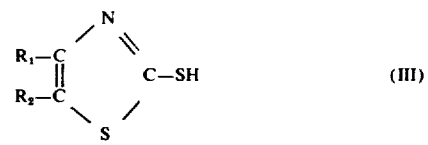

(III)

in which $R_1$ and $R_2$ are as defined above, using molecular oxygen and iron chloride in a solvent comprising a saturated aliphatic alcohol containing 1 to 10 carbon atoms.

In the formulae (I) and (II), $R_1$, $R_2$, R', R'', R''' and R'''' represent more particularly a chlorine or bromine atom; an alkyl radical such as methyl, ethyl, propyl, isopropyl, butyl, t-butyl and pentyl radicals; a methoxy, ethoxy, propoxy or butoxy radical; or a phenyl, toluyl, ethylphenyl, nitrophenyl, chlorophenyl, bromophenyl or naphthyl radical.

Specific examples of 2-mercapto-thiazoles which can be used to prepare the disulphides of the formula (I) include:
2-mercapto-thiazole
2-mercapto-4-methyl-thiazole
2-mercapto-4-ethyl-thiazole
2-mercapto-4-n-propyl-thiazole
2-mercapto-4-n-butyl-thiazole
2-mercapto-4,5-dimethyl-thiazole
2-mercapto-4,5-di-n-butyl-thiazole
2-mercapto-4-phenyl-thiazole
2-mercapto-5-chloro-4-phenyl-thiazole
2-mercapto-4-p-bromophenyl-thiazole
2-mercapto-4-m-nitrophenyl-thiazole
2-mercapto-4-m-chlorophenyl-thiazole
2-mercapto-benzothiazole
2-mercapto-4-methyl-benzothiazole
2-mercapto-5-methyl-benzothiazole
2-mercapto-6-methyl-benzothiazole
2-mercapto-4,5-dimethyl-benzothiazole
2-mercapto-4-phenyl-benzothiazole
2-mercapto-4-methoxy-benzothiazole
2-mercapto-6-methoxy-benzothiazole
2-mercapto-5,6-dimethoxy-benzothiazole
2-mercapto-6-methoxy-4-nitro-benzothiazole
2-mercapto-6-ethoxy-benzothiazole
2-mercapto-4-chloro-benzothiazole
2-mercapto-5-chloro-benzothiazole
2-mercapto-7-chloro-benzothiazole
2-mercapto-5-chloro-6-methoxy-benzothiazole
2-mercapto-5-chloro-4-nitro-benzothiazole
2-mercapto-5-chloro-6-nitro-benzothiazole
2-mercapto-4,5-dichloro-benzothiazole
2-mercapto-4,7-dichloro-benzothiazole
2-mercapto-5-nitro-benzothiazole and
2-mercapto-4-phenyl-benzothiazole.

2-Mercapto-benzothiazoles constitute a preferred class of starting compounds for preparing the corresponding disulphides by the process of the invention.

The following disulphides are mentioned as non-limiting examples of compounds which can be obtained by the process claimed:

2,2'-dithiazolyl disulphide
2,2'-bis-(4-methyl-thiazolyl) disulphide
2,2'-bis-(4-ethyl-thiazolyl) disulphide
2,2'-bis-(4-phenyl-thiazolyl) disulphide
2,2'-bis-(4-p-bromophenyl-thiazolyl)disulphide
2,2'-bis-(4-m-chlorophenyl-thiazole)disulphide
2,2'-bis-(4-m-nitrophenyl-thiazolyl) disulphide
phide
2,2'-bis-(5-chloro-4-phenyl-thiazolyl)disulphide
2,2'-dibenzothiazolyl disulphide
2,2'-bis-(6-methyl-benzothiazolyl)disulphide
2,2'-bis-(4-methyl-benzothiazolyl)disulphide
2,2'-bis-(4-methoxy-benzothiazolyl)disulphide
2,2'-bis-(6-ethoxy-benzothiazolyl)disulphide
2,2'-bis-(5-chloro-benzothiazolyl)disulphide
2,2'-bis-(5-chloro-4-nitro-benzothiazolyl)disulphide
2,2'-bis-(5-chloro-6-nitro-benzothiazolyl)disulphide
and
2,2'-bis-(6-nitro-benzothiazolyl)disulphide.

Alcohols which can be used as solvents, include methanol, ethanol, propanol, isopropanol, butanol, sec-butanol, t-butanol, pentanol, isopentanol, t-pentanol, hexanol, hectanol and octanol. Alcohols containing 2 to 8 carbon atoms, and more particularly isopropanol, are preferably used.

The amount of iron chloride employed can vary within wide limits, particularly 0.1 to 2 mols per mol of 2-mercapto-thiazole. In order to ensure that the reaction takes place rapidly, it is however preferable to use at least 0.5 mol of iron chloride per mol of 2-mercapto-thiazole, and preferably 0.8 to 1.5 mols per mol of 2-mercapto-thiazole. It is immaterial whether the iron chloride is used in the form of ferrous chloride or of ferric chloride, the latter being preferred, however, because it enables the reaction to start rapidly.

The concentration of the 2-mercapto-thiazole in the alcohol is not critical. It is decided in such a way as to ensure simultaneously the solubility of the thiol and high productivity of the equipment.

The gas containing molecular oxygen is conveniently air or of mixtures of oxygen and nitrogen which may contain more or less oxygen than air.

The partial pressure of oxygen is not critical and can assume very different values. A partial pressure of oxygen of 0.1 to 10 bars is generally very suitable.

The temperature at which the reaction is carried out can vary from 0° to 150°C and is preferably 20° to 100°C.

The process of the invention is particularly advantageous because it makes it possible to obtain excellent yields of dithiazolyl disulphide in relatively short reaction times, which is consistent with high productivity of the equipment. Thus 2,2'-dibenzothiazolyl disulphide can be obtained in a yield of about 95% in a reaction time of 1 hour 45 minutes. Furthermore, the process of the invention is a simple reaction, since the disulphide precipitates as it is formed and can be isolated easily by filtering the alcoholic solution of ferric chloride which contains, where appropriate, the unconverted 2-mercapto-thiazole; this solution can be re-used directly for another oxidation operation. Under these conditions, the process is very suitable for continuous operation. In short, the consumption of oxidising agent is limited to the consumption of oxygen.

The following Examples illustrate the invention and show how it can be put into practice.

EXAMPLE 1

6.72 g of 2-mercapto-benzothiazole followed by 100 cm$^3$ of isopropanol and 6.5 g of ferric chloride are introduced into a 250 cm$^3$ conical glass reactor equipped with a thermometer, a reflux condenser, a gas inlet dip tube ending in a sintered glass plate, a magnetic stirring system and an electric heating plate; the whole is stirred and then 100 cm$^3$ of isopropanol are added. The solution obtained is heated to 40°C at the same time as a stream of air is introduced at the rate of 15 l/hour under normal conditions of pressure and temperature. After 1 hour 45 minutes at this temperature, the contents of the apparatus are cooled to 20°C and the precipitate is then filtered off, washed on the filter with twice 20 cm$^3$ of isopropanol and dried in vacuo at 40°C to constant weight.

In this way, 6.3 g of a product are obtained which has a melting point of 177°C and the percentage analysis which corresponds to that of 2,2'-dibenzo-thiazolyl disulphide, which is also identified by thin layer chromatorgraphy. The yield relative to the 2-mercapto-benzothiazole employed is 94.8%.

The above experiment is repeated, cooling the contents of the apparatus after 30 minutes at 40°C, isolating the precipitate, and then heating the filtrate at 40°C under oxygen for a further 30 minutes; the filtrate is then cooled to 20°C and the precipitate obtained is isolated again.

The precipitate obtained after 30 minutes of reaction weighs 5.25 g and has the same melting point as above. The same applies to the product collected after 1 hour of reaction, which weighs 0.85 g. The yields after 30 minutes and 1 hour are thus respectively 79% and 91.8%.

EXAMPLE 2

The procedure of Example 1 is followed, but 0.65 g of FeCl$_3$ instead of 6.5 g are introduced. After 24 hours of reaction, 6.5 g of disulphide are isolated, corresponding to a yield of 97.6% relative to the 2-mercapto-benzothiazole employed.

EXAMPLE 3

The procedure of Example 1 is followed, but the isopropanol is replaced by n-propanol. The course of the reaction is followed by periodically isolating the precipitate which is treated in the same way as in Example 1. The following results are obtained:

| Duration of reaction | Weight of precipitate in g | Yield of disulphide/ to the thiol employed % |
|---|---|---|
| 30 mins. | 0.15 | 2 |
| 1 hr. | 2.85 | 45 |
| 1 hr. 45 mins. | 1.20 | 63 |
| 3 hrs. | 1.45 | 85 |
| 5 hrs. | 0.5 | 92 |
| 21 hrs. 30 mins. | 0.2 | 95 |

EXAMPLES 4 TO 8

The procedure of Example 3 is followed, replacing the n-propanol by the alcohols listed below. The results given in the following table were obtained:

| Ex. | Solvents | Weight of precipitate in g. | | | Yields of disulphide/thiol employed % | | |
|---|---|---|---|---|---|---|---|
| | | 3 hrs. | 6 hrs. 30 mins. | 30 hrs. 30 mins. | 3 hrs. | 6 hrs. 30 mins. | 30 hrs. 30 mins. |
| 4. | ethanol | 3.25 | 1.9 | 1.25 | 49 | 78 | 96.8 |
| 5 | butanol | 5.40 | 0.85 | | 81 | 93.9 | |
| 6 | pentanol | 5.40 | 0.75 | 0.05 | 81 | 92.3 | 93 |
| 7 | hexanol | 5.05 | 0.35 | 0.15 | 76 | 81.2 | 83.4 |
| 8 | heptanol | 3.90 | 1.8 | 0.2 | 58.5 | 85.5 | 88.3 |

I claim:

1. Process for the preparation of a 2,2'-dithiazolyl disulphide of the general formula:

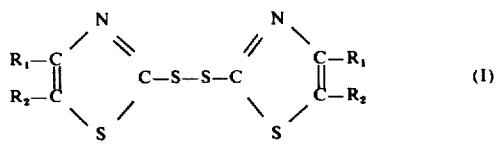 (I)

in which $R_1$ and $R_2$, which may be identical or different, each represents a hydrogen atom, a halogen atom, a nitro group, an alkyl or alkoxy radical containing 1 to 5 carbon atoms, or an unsubstituted aryl, haloaryl, nitroaryl, alkaryl or alkoxyaryl radical, where the aryl residue contains 6 to 12 carbon atoms and the alkyl or alkoxy residues contain 1 to 5 carbon atoms, or $R_1$ and $R_2$ together form a divalent radical of the general formula:

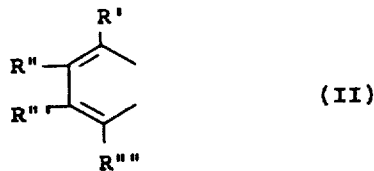 (II)

in which R', R'', R''' and R'''', which may be identical or different, each represents a hydrogen atom, a halogen atom, a nitro group, an alkyl or alkoxy radical containing 1 to 5 carbon atoms, or an unsubstituted aryl, haloaryl, nitroaryl, alkaryl or alkoxyaryl radical where the aryl residue contains 6 to 12 carbon atoms and the alkyl or alkoxy residue contains 1 to 5 carbon atoms, which comprises oxidation of a 2-mercapto-thiazole of the general formula:

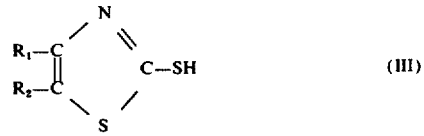 (III)

in which $R_1$ and $R_2$ are as defined above, using molecular oxygen and iron chloride in a solvent comprising a saturated aliphatic alcohol containing 1 to 10 carbon atoms, the proportion of iron chloride being 0.1 mol to 2 mols per mol of 2-mercaptothiazole.

2. Process according to claim 1, wherein the alcohol contains 2 to 8 carbon atoms.

3. Process according to claim 1, wherein the alcohol is isopropanol.

4. Process according to claim 1, wherein the reaction temperature is 0° to 150°C.

5. Process according to claim 1, wherein the partial pressure of oxygen is 0.1 to 10 bars.

6. Process according to claim 1, wherein the iron chloride is ferric chloride.

7. Process according to claim 1, wherein 2-mercaptobenzothiazole is oxidised with air and ferric chloride in isopropanol.

* * * * *